(12) United States Patent
Matsumoto et al.

(10) Patent No.: US 7,360,798 B2
(45) Date of Patent: Apr. 22, 2008

(54) THREADED JOINT FOR STEEL PIPES

(75) Inventors: Keishi Matsumoto, Takarazuka (JP);
Kunio Goto, Kobe (JP); Toshiro Anraku, Nishinomiya (JP); Shigeo Nagasaku, Nishinomiya (JP); Hideo Yamamoto, Takarazuka (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 10/765,837

(22) Filed: Jan. 29, 2004

(65) Prior Publication Data

US 2004/0239105 A1    Dec. 2, 2004

Related U.S. Application Data

(63) Continuation of application No. PCT/JP03/06743, filed on May 29, 2003.

(30) Foreign Application Priority Data

May 31, 2002    (JP) ............................. 2002-159563

(51) Int. Cl.
*F16L 15/00*  (2006.01)
*C10M 159/06*  (2006.01)

(52) U.S. Cl. ................. 285/94; 285/333; 285/334; 428/36.91; 508/450; 508/451; 508/539

(58) Field of Classification Search ............... 285/55, 285/94, 333, 334, 355, 390; 428/36.91, 484.1; 508/450, 451, 539
See application file for complete search history.

(56) References Cited

U.S. PATENT DOCUMENTS 3,849,323 A * 11/1974 Hollinshead ............... 508/308
3,869,393 A *  3/1975 Booker ...................... 508/167
3,996,398 A * 12/1976 Manfredi .................... 427/451
4,256,811 A *  3/1981 Black ......................... 428/562

(Continued)

FOREIGN PATENT DOCUMENTS

GB        1033735        6/1966
GB     2140117 A   * 11/1984
JP       58-179295       10/1983

(Continued)

*Primary Examiner*—James M. Hewitt
(74) *Attorney, Agent, or Firm*—Clark & Brody (57) ABSTRACT

A threaded joint for steel pipes comprising a pin 1 and a box 2 each having a contact surface comprising a threaded portion 3 or 4 and an unthreaded metal contact portion 8 is provided with improved anti-galling propertied by forming a lubricating coating on the contact surface of at least one of the pin and the box, the lubricating coating exhibiting a self-repairing function by liquid lubrication and having a decreased greasiness. The lubricating coating is (1) a coating which comprises a lower lubricant layer which is in liquid form in the temperature range of above 0° C. and below 40° C. and an upper lubricant layer which is in solid form at 40° C., or (2) a coating which is semi-solid or solid at 40° C. and is formed of a mixture comprising a lubricating oil which is in liquid form in the temperature range of above 0° C. and below 40° C. and a wax which is in solid form at 40° C., the mixture preferably having been heated so as to liquefy the wax and dissolve in each other the wax and lubricant oil.

9 Claims, 1 Drawing Sheet

U.S. PATENT DOCUMENTS

| | | | | |
|---|---|---|---|---|
| 4,468,309 A * | 8/1984 | White | ............................ | 427/528 |
| 4,474,651 A * | 10/1984 | Yauchi et al. | ................ | 285/329 |
| 4,527,815 A * | 7/1985 | Frick | ............................ | 285/55 |
| 4,630,849 A * | 12/1986 | Fukui et al. | .................... | 285/55 |
| 4,692,988 A * | 9/1987 | Shulver et al. | ................ | 29/458 |
| 4,758,025 A * | 7/1988 | Frick | ............................ | 285/55 |
| 4,813,714 A * | 3/1989 | Fairey et al. | ................ | 285/94 |
| 4,830,411 A * | 5/1989 | Tsuru et al. | .................. | 285/334 |
| 4,871,194 A * | 10/1989 | Kawashima et al. | ........... | 285/55 |
| 5,253,902 A * | 10/1993 | Petelot et al. | .................. | 285/94 |
| 5,678,608 A * | 10/1997 | Fontana | ..................... | 138/96 T |
| 6,017,857 A * | 1/2000 | Heimann et al. | ............ | 508/136 |
| 6,027,145 A * | 2/2000 | Tsuru et al. | .................. | 285/94 |
| 6,394,190 B2 * | 5/2002 | Linden | ............................ | 173/1 |
| 6,659,509 B2 * | 12/2003 | Goto et al. | .................... | 285/94 |
| 6,679,526 B2 * | 1/2004 | Yamamoto et al. | ............ | 285/55 |
| 6,746,057 B2 * | 6/2004 | Goto et al. | .................. | 285/333 |
| 6,827,996 B2 * | 12/2004 | Goto | ......................... | 428/36.9 |
| 6,869,111 B2 * | 3/2005 | Goto et al. | .................. | 285/333 |
| 6,933,264 B2 * | 8/2005 | Petelot | ......................... | 508/318 |
| 2003/0066641 A1 * | 4/2003 | Yamamoto | ................ | 166/242.6 |
| 2003/0094810 A1 * | 5/2003 | Goto et al. | ..................... | 285/94 |
| 2003/0111838 A1 * | 6/2003 | Goto et al. | ..................... | 285/94 |
| 2003/0159764 A1 * | 8/2003 | Goto | ........................... | 148/519 |
| 2003/0160446 A1 * | 8/2003 | Goto et al. | .................... | 285/94 |
| 2004/0195825 A1 * | 10/2004 | Anraku et al. | ................. | 285/94 |

FOREIGN PATENT DOCUMENTS

| | | |
|---|---|---|
| JP | 02-142895 | 5/1990 |
| JP | 08-103724 | 4/1996 |
| JP | 08-105582 | 4/1996 |
| JP | 08-233163 | 9/1996 |
| JP | 08-233164 | 9/1996 |
| WO | WO 01/16516 A1 * | 3/2001 |
| WO | WO 02/18522 A1 | 3/2002 |

* cited by examiner

THREADED JOINT FOR STEEL PIPES

This application is a continuation of International Patent Application No. PCT/JP03/06743, filed May 29, 2003. This PCT application was not in English as published under PCI Article 21(2).

TECHNICAL FIELD

This invention relates to a threaded joint for steel pipes having a lubricating coating on the surface thereof and particularly to such a threaded joint in which the lubricating coating provides the threaded joint with improved galling resistance so as to make it possible to fasten and loosen the joint repeatedly, with the coating having a decreased greasiness to minimize the tendency for foreign matter to adhere to the coating.

BACKGROUND ART

Oil well pipes such as tubing and casing used in the drilling of oil or gas wells are typically connected to each other by threaded joints. In the past, the depth of oil wells was typically 2000 to 3000 meters, but more recently, the depth of oil wells may reach 8,000 to 10,000 meters in offshore oil fields and other deep wells.

A threaded joint for oil well pipes is subjected to various forces in its environment of use, including loads such as axial tensile forces caused by the weight of the oil well pipe and the joint member (coupling), pressures due to combined internal and external pressures, and geothermal heat which increases as the depth increases. Therefore, a threaded joint needs to be able to maintain gas tightness without rupture in such environments.

During the process of lowering tubing or casing into a well, a joint which is once fastened for connection often needs to be loosened and then re-fastened. API (American Petroleum Institute) requires that there be no occurrence of galling, which is unrecoverable severe seizing, and that gas-tightness be maintained even if fastening (make-up) and loosening (break-out) are repeated ten times for a tubing joint and three times for a casing joint, which has a larger diameter than a tubing joint.

In order to cope with these requirements, in recent years, a special threaded joint which has a metal-to-metal contact portion without threads (hereunder referred to as an "unthreaded metal contact portion"), in addition to a threaded portion, and which is capable of forming a metal-to-metal seal to improve gas-tightness has widely been used. In this type of threaded joint, typically, a pin is formed on the outer surface of each end of an oil well pipe, and it has an externally threaded portion and an unthreaded metal contact portion. A mating box is formed on the inner surface of a separate, sleeve-shaped coupling member, and it has an internally threaded portion and an unthreaded metal contact portion so as to mate with the corresponding threaded and unthreaded portions of the pin. When the pin is screwed into the box for fastening, the unthreaded metal contact portions of the pin and the box are made to tightly contact each other to form a metal-to-metal seal.

In order to guarantee adequate sealing properties by the metal-to-metal seal of a threaded joint in the environment of an oil well pipe, an extremely high pressure must be applied to the unthreaded metal contact portion during fastening. This high pressure makes it easy for galling to take place. Therefore, prior to fastening, a lubricating grease called a compound grease, which is a viscous fluid at room temperature, is applied to the metal-to-metal contact portion and the threads in order to impart an increased resistance to galling and improved gas tightness.

However, a compound grease contains a large amount of a powder of a heavy metal such as lead, zinc, or copper. When a compound grease applied to a threaded joint is washed off, there is a concern of its causing environmental pollution. In addition, the application of compound grease worsens the work environment and decreases the work efficiency. Thus, there is a need of a threaded joint which can be used without application of a lubricating grease such as a compound grease.

With respect to a threaded joint for which it is not necessary to apply a lubricating grease, JP 08-103724 A1 (1996), JP 08-233163 A1 (1996), and JP 08-233164 A1 (1996) propose a threaded joint in which a solid lubricant-based lubricating coating (hereinafter referred to as "solid lubricating coating") comprising a solid lubricant such as molybdenum disulfide bonded with a resin such as an epoxy resin is formed on the unthreaded metal contact portion of the pin or box of the threaded joint.

However, it is not easy to form a solid lubricating coating to a uniform thickness along the outline of the threads and the unthreaded metal contact portion of a threaded joint. If the coating has an uneven thickness, an excessively high pressure is required in areas where the lubricating coating is thicker to fasten the threaded joint, thereby increasing the fastening torque, or causing the threads to deform and hence causing galling to occur easily. On the other hand, in areas where the lubricating coating is thinner, poor lubrication or rusting may occur easily.

Even in the case where a solid lubricating coating is formed to a uniform thickness, galling may occur easily under conditions that the joint is fastened and loosened repeatedly or foreign matter is present. The presence of foreign matter takes place, for example, when an oil well pipe is stood upright for connection with a threaded joint, and rust formed on the inner wall of the pipe or blasted grains used for descaling and remaining inside the pipe fall through the inside of the pipe and part thereof adheres to the threads or unthreaded metal contact portion.

A solid lubricating coating has poor ductility and fluidity, and therefore, it tends to easily peel off. Under the above-described conditions, during fastening of a threaded joint, a part of the threads or unthreaded metal contact portions of the joint is subjected to an excessively high pressure, thereby causing plastic deformation to occur locally only in such part of the joint, leading to peeling of the solid lubricating coating to expose the underlying bare metal surface. Then, even if the exposed metal surface is small in area, galling occurs easily.

Another disadvantage of a solid lubricating coating is that its rust-preventing properties are not sufficient to adequately protect the threaded joint from rusting while it is stored prior to use in the field near an oil well. Since rust has a poor lubricity, the formation of rust and the accompanying blistering or peeling of the solid lubricating coating make the torque required for fastening of the joint unstable, thereby often resulting in occurrence of galling or a decrease in the gas tightness achieved by fastening.

On the other hand, in the case of a liquid lubricant such as a lubricant grease or oil which is fluid at room temperature, the lubricant confined in the gaps of the threads or the recesses of the surface roughness of the threaded joint can seep out by the action of pressure applied during fastening. As a result, even if a part of the threaded joint is subjected to an excessively high pressure, the liquid lubricant can extend to that part by seepage, thereby making it possible to prevent galling. This action is called a self-repairing function of a liquid lubricant. In general, the higher the fluidity of a liquid lubricant (the lower the viscosity thereof), the higher is its self-repairing function. Furthermore, a liquid lubricant has good rust-preventing properties.

However, among conventional liquid lubricants, those which have good anti-galling properties and which can be applied to a threaded joint having a metal-to-metal seal portion contain a large amount of heavy metals, as is the case with a compound grease, and hence they produce environmental problems. In addition, to application of a liquid lubricant or lubricating grease makes the surface of the applied threaded joint greasy, and foreign matter such as grit, sand, and dirt may tend to readily adhere to the threads and unthreaded metal contact portions of the joint. Particularly, when an oil well pipe is stood upright for connection, rust and blasted grains fall through the inside of the pipe. At this time, if the surface of the threaded joint is greasy, a considerable part of the rust and blasted grains adhere to the surface. As a result, even with a liquid lubricating grease which is expected to exert a self-repairing function, it is difficult to provide sufficient lubricity, and galling may occur upon repeated fastening and loosening of the joint.

DISCLOSURE OF THE INVENTION

The present invention provides a threaded joint for steel pipes in which the above-described problems of a solid lubricating coating and a liquid grease are alleviated or eliminated.

More specifically, the present invention provides a threaded joint for steel pipes having a lubricating coating which has a decreased greasiness and provides the joint with good anti-galling and rust-preventing properties without application of a heavy metal-containing lubricating grease.

As discussed earlier, a liquid lubricant has a self-repairing function and good rust-preventing properties, so it is more suitable than a solid lubricating coating for use in lubrication of a threaded joint for steel pipes, for which anti-galling properties during repeated fastening and loosening are required. However, in order to attain a high level of lubricity which is sufficient to provide such anti-galling properties to a metal-to-metal seal portion, it is necessary to include a large amount of a heavy metal powder in the liquid lubricant, thereby causing environmental problems. With a lubricating oil alone, only a thin coating can be formed, so the lubricity is not sufficient. In addition, in order to prevent adhesion of foreign matter which causes a decrease in anti-galling properties, it is necessary to suppress the greasiness of the coating as much as possible. In contrast, a solid lubricating coating is free from these problems.

The present inventors have found that the above-described problems of a liquid lubricant can be eliminated by using a liquid lubricant and a solid lubricant together. Specifically, either (1) a lubricating coating having a lower layer of a liquid lubricant and an upper layer of a solid lubricant or (2) a semi-solid or solid lubricating coating which is formed of a mixture comprising a lubricating oil as a liquid lubricant and a wax as a solid lubricant is formed on the surface of a threaded joint to be lubricated.

Thus, the present invention relates to a threaded joint for steel pipes which comprises a pin and a box each having a contact surface including a threaded portion and an unthreaded metal contact portion and which has a lubricating coating on the contact surface of at least one of the pin and the box.

In a first embodiment of the invention, the lubricating coating comprises a lower lubricant layer which is in liquid form in the temperature range of above 0° C. and below 40° C. and an upper lubricant layer which is in solid form at 40° C.

In a second embodiment of the invention, the lubricating coating is semi-solid or solid at 40° C. and is formed of a mixture comprising a lubricating oil which is in liquid form in the temperature range of above 0° C. and below 40° C. and a wax which is in solid form at 40° C.

The temperature range of above 0° C. and below 40° C. is a temperature range to which oil well pipes are generally exposed during storage, transportation or shipment, and connection in the field.

With a threaded joint for steel pipes according to the first embodiment in which a lubricating coating of two layers is formed, since the upper layer appearing on the surface of the coating is a solid layer, the coating is not greasy on the surface, and it is difficult for foreign matter to adhere thereto. The upper solid layer is relatively easily broken to cause the liquid lubricant in the lower layer to appear upon application of an excessively high pressure during fastening or loosening. As a result, in spite of the presence of a solid layer on the surface, it is possible for the liquid lubricant in the lower layer to exert its self-repairing function and provide the threaded joint with good anti-galling properties. Furthermore, when the contact surface of a threaded joint is initially coated with a lower layer of a liquid lubricant, the irregular surface of the contact surface is made flat by filling with the lubricant, so it is easy to form a surface or upper layer of a solid lubricant to a uniform thickness, thereby minimizing the occurrence of a local excessively high pressure due to a fluctuation in the thickness of the solid lubricant layer.

In a threaded joint for steel pipes according to the second embodiment in which a semi-solid or solid lubricating coating of a mixture comprising a lubricating oil and a wax is formed, it is preferred that the mixture have been heated to at least the temperature at which the wax is liquefied to form a liquid mixture, which forms, upon cooling, a mixture in which the wax and the lubricating oil have been dissolved in each other.

A coating formed by dispersing wax particles in a lubricating oil is normally in the form of liquid or semi-solid at room temperature, and it may be as greasy as the lubricating oil, so foreign matter may tend to adhere thereto. In contrast, a coating of a mixture comprising a lubricating oil and a wax formed by heating the mixture so as to cause the oil and wax to dissolve in each other is in the form of solid or semi-solid at room temperature, which is less greasy or has a dry touch, and it is difficult for foreign matter to adhere thereto. However, during fastening or loosening of the threaded joint, the wax melts immediately by the generated frictional heat so that the entire coating is liquefied. Accordingly, the same self-repairing function as obtained with a liquid lubricant can be attained, and good anti-galling properties are exhibited.

In the second embodiment, the process of manufacturing a threaded joint is simpler compared to the first embodiment, since the lubricating coating is a single layer coating which is formed by a single application procedure.

Thus, in both the first and the second embodiments of the present invention, it is possible to achieve good anti-galling properties attributable to the self-repairing function of a liquid lubricant along with a decreased greasiness of the surface of a lubricating coating.

In addition, in both embodiments, the liquid lubricant is constrained by the upper solid lubricant layer in the first embodiment or by the coexisting solid wax in the second embodiment, so the liquid lubricant can be retained on the contact surface of the threaded joint in an amount sufficient to exert its self-repairing function adequately to prevent galling. As a result, it is possible to provide a threaded joint with good anti-galling properties capable of withstanding repeated fastening and loosening without inclusion of a heavy metal powder.

DESCRIPTION OF EMBODIMENTS OF THE INVENTION

Figure 1:
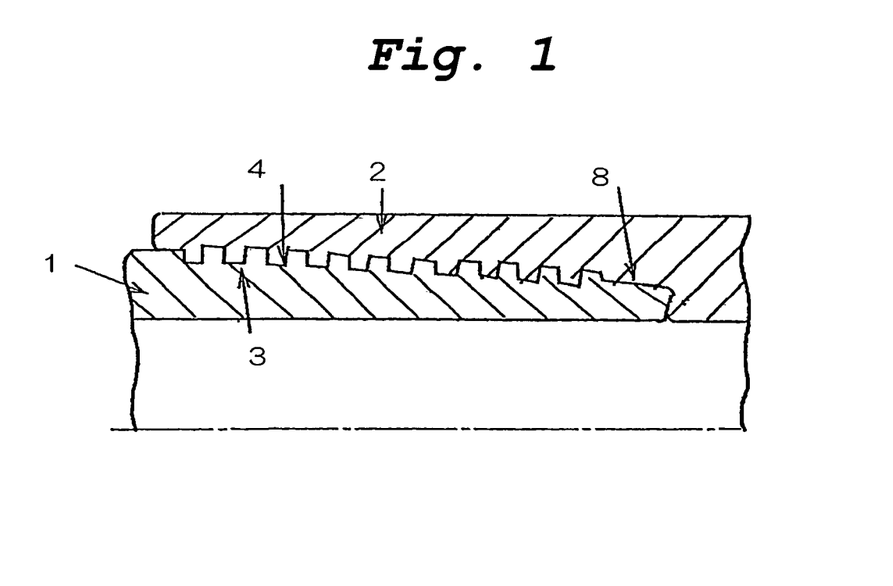
FIG. 1 is a schematic cross-sectional view showing a threaded joint for steel pipes having a threaded portion and an unthreaded metal contact portion.

As illustrated in FIG. 1, a typical threaded joint for steel pipes comprises a pin 1 formed on the outer surface of a steel pipe such as an oil well pipe at each of its ends and a box 2 formed on the inner surface of each end of a sleeve-like threaded coupling member. The pin 1 has an externally threaded portion 3 and an unthreaded metal contact portion 8. Typically the unthreaded metal contact portion is located at the tip of the pipe, and the externally threaded portion extends inwardly therefrom. Correspondingly, the box 2 has an internally threaded portion 4 and an unthreaded metal contact portion 8. However, it is possible to employ an inverted structure in which a pin is formed on a coupling member and a box is formed at both ends of a steel pipe, or to omit a coupling member by forming a pin at one end of a steel pipe and a box at the other end of the pipe.

For each of the pin and the box, the threaded portion and the unthreaded metal contact portion thereof constitute its contact surface. According to the present invention, the contact surface of at least one of the pin and the box has a lubricating coating formed thereon in accordance with the above-described first or second embodiment. It is sufficient for the lubricating coating to be formed on the contact surface of either the pin or box, although it may be formed, of course, on the contact surface of both the pin and the box. It is preferred that the lubricating coating be formed on the entire contact surface, but it may be formed only on a part of the contact surface. In the latter case, the lubricating coating is preferably formed on the unthreaded metal contact portion of the contact surface, which is more susceptible to galling than the threaded portion.

In the first embodiment of the present invention, the contact surface of the pin and/or box of a threaded joint for steel pipes has a lubricating coating formed thereon which comprises two layers consisting of a lower lubricant layer which is in liquid form in the temperature range of above 0° C. and below 40° C. (hereinafter referred to as a liquid layer) and an upper lubricant layer which is in solid form at 40° C. (hereinafter referred to as a solid layer). Thus, a liquid lubricant (typically a lubricating oil) is initially applied to the contact surface to form the liquid layer, and the solid layer is then formed on the liquid layer.

The lower liquid layer preferably has a thickness in the range of from 0.5 to 1000 μm, in which range sufficient lubricity to prevent galling can be obtained. If the liquid layer is too thick, the upper solid layer tends to slip and hence to be broken. However, such a phenomenon does not occur when the thickness of the liquid layer is within the above-described range. More preferably, the thickness of the liquid layer is from 1 to 100 μm.

The upper solid layer preferably has a thickness in the range of from 1 to 200 μm, in which range its coating strength is sufficient to prevent it from breaking when subjected to light contact with another body, and at the same time the solid layer does not impede the self-repairing function of the lower liquid layer after it has been broken by the force applied during fastening of the threaded joint. More preferably, the thickness of the solid layer is from 1 to 50 μm.

It is preferable that the liquid layer be formed from a lubricating oil which is in liquid form in the temperature range of above 0° C. and below 40° C. The lubricating oil may be a mineral oil, a synthetic ester oil, an animal or vegetable oil, or it may comprise two or more of these oils in combination. The lubricating oil may contain various additives for the purpose of improving anti-galling, rust-preventing, or other properties. Such an additive, if it is a liquid, may be used as a lubricant oil by itself.

One class of a particularly preferable additive is a basic metal salt of an organic acid, which is highly effective in order to improve anti-galling and rust-preventing properties. The basic metal salt of an organic acid is in viscous liquid or greasy form and contains a large amount of an excess metal salt (typically a carbonate) precipitated in the form of colloidal microparticles. The microparticles of a metal salt, when present in a gap between the contact surfaces of a pin and a box, can prevent the contact surfaces from galling. Since the basic metal salt of an organic acid is liquid, it can form the liquid layer by itself, but it may be used as a mixture with the above-described lubricating oil.

The basic metal salt of an organic acid includes a basic metal sulfonate, a basic metal phenate, a basic metal salicylate, a basic metal carboxylate, and the like. The metal salt may be an alkali metal salt, but preferably it is an alkaline earth metal salt and particularly a calcium, barium, or magnesium salt. The basic metal salt of an organic acid preferably has a basicity in the range of 50-500 mg KOH/g. One or more of these basic metal salts may be used.

Other appropriate additives may be used. Examples of useful additives are those known as additives to lubricating oils such as corrosion inhibitors, antioxidants, viscosity modifiers, oiliness improvers, and extreme pressure agents.

In order to improve the anti-galling properties or the dry touch of the lubricating coating, a solid fine powder may be added to the liquid layer. However, the fine powder may possibly inhibit the fluidity of the coating during fastening and loosening of the joint unless it is added in a small amount. The amount of the fine powder, if added, is preferably at most 5%. The fine powder which can be used includes those of materials such as molybdenum disulfide, tungsten disulfide, graphite, mica, boron nitride, and polytetrafluoroethylene, which are generally used as a solid lubricant, as well as a resin powder. The fine powder preferably has a particle diameter of 10 μm or less. A larger particle diameter may cause the formation of flaws. In addition, a metal salt of a fatty acid may be included in the liquid layer as described later.

It is preferable that the liquid layer comprise one or more materials selected from mineral oils, synthetic ester oils, animal or vegetable oils, and basic metal salts of an organic acid. These materials which are used to form the liquid layer preferably have a viscosity of 10 cSt or greater at 40° C. If the viscosity is too low, the liquid layer may run off before it is constrained by the upper solid layer, thereby causing the liquid layer to be unable to have a desired thickness. In addition, the application of the upper solid layer may become difficult.

The liquid layer may be formed in a conventional manner. Thus, the lubricating oil which constitutes the liquid layer is applied to the contact surface of a threaded joint (i.e., the contact surface of its pin an/or box) by a suitable coating method such as brush coating, spraying, or dip coating, optionally after one or more appropriate additives are added and, if the viscosity of the oil is so high as to make the application difficult, after the oil is diluted with a volatile organic solvent. When a solvent is used, the applied coating is dried with or without heating to remove the solvent.

The solvent may be a common volatile solvent. Examples of useful solvents are alcohols such as ethanol, propanol, isopropanol, and butanol; hydrocarbons such as toluene and xylene; and mineral spirit, kerosine, synthetic naphthene, and petroleum benzine.

Prior to the formation of the lower liquid layer, the contact surface of the threaded joint on which a lubricating coating is to be formed may be subjected to preliminary surface treatment. Such preliminary surface treatment can be performed for the purpose of improving the retention of the lubricating coating by increasing the surface roughness, or improving the anti-galling properties of the joint by increasing the corrosion resistance and/or hardness of the contact surface.

Preliminary surface treatment for improving the retention of the lubricating coating includes slight pickling, sand or shot blasting, phosphating (phosphate-type chemical conversion treatment) such as manganese phosphate treatment or zinc phosphate treatment, oxalate-type chemical conversion treatment such as iron oxalate treatment, glass peening, and zinc blasting.

On the other hand, preliminary surface treatment for improving anti-galling properties includes plating with a metal such as nickel, chromium, copper, zinc, tin, or iron, or an alloy of two or more of these metals (e.g., an Ni—Cr, Cu—Sn, or Zn—Fe alloy), nitriding, and treatment to form a coating of TiC, TiN, TiCN, DLC (diamond like carbon), $Cr_xN_y$, Ti BN, TiAlN, TiCrN, or the like which can be formed by vapor deposition such as PDV or CVD. It is also possible to use a method in which the surface is subjected to heat treatment to form an oxide layer.

When the contact surface is subjected to preliminary surface treatment, it is preferable that the lubricating coating be formed soon after the preliminary surface treatment, since the surface has a high wettability, thereby improving the adhesion and retention of the resulting lubricating coating. It is thought that preliminary surface treatment causes an active surface to be exposed or form and thus increases the chemical or physical adsorption of the lubricating coating by the surface. It is preferable that the interval between the preliminary surface treatment and the application of the lubricating coating be as short as possible, but an adequate effect can be obtained if the interval is at most one hour.

Since the surface of the liquid layer is greasy, an upper solid layer is formed on the liquid layer in order to decrease the greasiness of the lubricating coating. The solid layer is formed from a lubricating material which is in solid form at 40° C. If the solid layer is in liquid form at 40° C., the solid layer may become greasy and fail to achieve the effect desired for that layer in those situations where the outside air temperature is high or the joint is exposed to direct sunlight.

It is preferable that the upper solid layer be a coating layer of a relatively flexible solid organic material or a coating layer having a relatively low mechanical strength formed by loosely bonding a lubricating powder with a binder. This is because the solid layer should be broken at an early stage during fastening of the threaded joint so as to allow the lower liquid layer to effectively contribute to lubrication and exert its self-repairing function, thereby increasing the lubricity of the entire coating.

In order to prevent the broken solid layer from remaining in the frictional interface between the pin and the box and thus becoming an obstacle to the subsequent fastening and loosening of the threaded joint, it is preferred that the broken solid layer be allowed to dissolve in the oil of the liquid layer due to the temperature elevation by the frictional heat generated during fastening, or to collapse into a finely divided powder which can be dispersed in the liquid layer. For example, a conventional solid lubricating coating which comprises a powder of a solid lubricant bonded with a resin has a mechanical strength which is too high for it to be used as a solid layer in the present invention, so it is not easily broken at an early stage of fastening, and if it is broken, it does not form a finely divided powder.

Examples of a solid organic material suitable for forming a solid layer which can dissolve in the lower liquid layer during fastening include waxes, resins, higher fatty acids, higher alcohols, fats, drying oils, and semidrying oils which are or become solid at 40° C. One or more materials selected from these may be used. In order to cause the solid layer to dissolve in the lower liquid layer by the above-described temperature elevation, if the solid organic material has a melting point, it is preferable that the melting point be 120° C. or lower, or if it does not have a melting point, it is preferable that the solid material exhibit fluidity at 120° C.

As a material for forming the solid layer, a wax may be any of animal, vegetable, mineral, or synthetic wax. Examples of useful waxes include beeswaxes and whale waxes as animal waxes, wood waxes, carnauba waxes, candelilla waxes, and rice waxes as vegetable waxes, paraffin waxes, microcrystalline waxes, petrolatum, montan waxes, ozokerite, and ceresin as mineral waxes, and oxide waxes, polyethylene waxes, Fischer-Tropsch waxes, amide waxes, and hardened castor oils (castor waxes) as synthetic waxes.

A higher fatty acid may be a mono-, di-, or tri-carboxylic acid having 10 or more carbon atoms. The hydrocarbyl group of the acid may be either saturated or unsaturated.

A higher alcohol may be a primary, secondary or tertiary alcohol having 12 or more carbon atoms. The hydrocarbyl group of the alcohol may be either saturated or unsaturated.

Examples of useful resins include acrylic resins, polyethylene resins, polystyrene resins, polypropylene resins, polyvinyl chloride resins, polyvinyl acetate resins, urethane resins, epoxy resins, nylon 6.6, phenolic resins, urea resins, melamine resins, and silicone resins.

As a fat, drying oil, or semidrying oil, various oils including, for example, linseed oil, castor oil, and rapeseed oil may be used.

Among the above-described organic materials, a wax is most preferred for the formation of the solid layer in view of its lubricity and mode of breaking. In particular, paraffin waxes, oxide waxes, microcrystalline waxes, petrolatum, wood waxes, ozokerite, and ceresin are preferred.

In order to form the solid layer, the solid organic material which is used (e.g., a wax) is made liquid either by dissolving it in an appropriate volatile solvent or is heating it to melt, and is then applied onto the lower liquid layer to form an upper layer. The application may be performed by spraying or brush coating. In order to form the upper solid layer as a discrete layer from the lower liquid layer, the materials used to form the upper layer are selected such that the organic material and the solvent, if used, do not completely dissolve in the lower layer while the upper layer is formed. The solid organic material may also be used in a powder form to disperse in an appropriate solvent. The resulting dispersion is then applied onto the lower liquid layer, and is heated to remove the solvent and melt the powder forming a solid layer.

The material forming the solid layer may be dissolved in the lower liquid layer while the material is in liquid form. In such case, the materials of the solid and liquid layers are dissolved in each other and form a single-layer, solid or semisolid lubricating coating according to the second embodiment, which is described later more fully.

The solid layer may also be formed from a lubricating powder by bonding it loosely with a binder so as to form a coating having a relatively low mechanical strength. The lubricating powder may be a powder of molybdenum disulfide, tungsten disulfide, graphite, mica, boron nitride, or polytetrafluoroethylene. In addition, powder of a resin having a melting point below 120° C. can also be used as a lubricating powder in the present invention, since such a powder will melt and become liquid by the temperature elevation due to the frictional heat generated during fastening of the threaded joint and thus can exhibit lubricity. An example of such a resin powder is a powder of polyethylene or polystyrene. Preferably, the particle diameter of the lubricating powder is 10 μm or less for the above-described reason if it does not melt below 120° C.

A solid layer comprising a lubricating powder can be formed by bonding the powder with an appropriate binder. The binder may be one or more of nitrocellulose, an acrylic resin, a polyvinyl chloride resin, a polyvinylbutyral, a rubber, and a fluororesin, for example, and the solid layer is preferably formed by drying at room temperature. Other bonding methods such as baking or reactive cross-linking are difficult to perform due to the presence of the lower liquid layer.

According to the second embodiment of the present invention, the contact surface of at least one of the pin and the box has a lubricating coating formed thereon which is solid or semisolid at 40° C. and which is formed of a mixture comprising a lubricating oil which is in liquid form in the temperature range of above 0° C. and below 40° C. and a wax which is in solid form at 40° C. As described above, this lubricating coating has a decreased greasiness, and the wax in the coating will melt by the frictional heat generated during fastening of the threaded joint, thereby causing the entire coating to liquefy and exhibit good anti-galling properties with a self-repairing function.

In order for the lubricating coating to exert such an effect, its thickness is preferably in the range of 1-1000 μm and more preferably 10-100 μm. An excessively thick coating is not only a waste of materials but also undesirable from an environmental viewpoint.

The "lubricating oil which is in liquid form in the temperature range of above 0° C. and below 40° C." (hereinafter referred to simply as lubricating oil) which is used in the lubricating coating may be the same material as the liquid lubricant which can be used to form the lower liquid layer of the lubricating coating in the above-described first embodiment. Thus, the liquid lubricating oil is preferably one or more materials selected from mineral oils, synthetic ester oils, animal or vegetable oils, and basic metal salts of an organic acid. A preferable viscosity of the oil is also the same as described above. The lubricating oil may include one or more appropriate additives (e.g., a corrosion inhibitor, an antioxidant, a viscosity modifier, an oiliness improver, an extreme pressure agent, and/or a solid powder).

Similarly, the "wax which is in solid form at 40° C." (hereinafter referred to simply as wax) and the types of preferable waxes may be the same as described above for the first embodiment with respect to the upper solid layer. The melting point of the wax is above 40° C. and preferably below 120° C. for the above-described reason.

The mixture may include, in addition to the lubricating oil and wax, a solid additive which is solid at 40° C. The solid additive may be one or more materials selected from resins, higher fatty acid, metal salts of a fatty acid, higher alcohols, fats, drying oils, and semidrying oils.

Of these solid additives, the metal salts of a fatty acid include alkali metal salts and alkaline earth metal salts (e.g., sodium salts and calcium salts) of a fatty acid such as stearic acid, oleic acid, palmitic acid, or the like. Preferred are alkali metal salts and alkaline metal salts of stearic acid or oleic acid, and in particular sodium stearate and calcium stearate are preferred. Examples of the other solid additives are the same as described for the first embodiment with respect to the solid materials which can be used to form the solid layer.

The proportion of the lubricating oil and the wax in the mixture is selected in such a manner that a solid or semisolid lubricating coating can be formed from the mixture. If the proportion of the lubricating oil is too high, a liquid coating will be formed. A preferred proportion is such that the mass ratio of lubricating oil to wax is in the range of from 1:10 to 10:1 and preferably from 1:4 to 4:1.

When a solid additive is included in the mixture, the amount of the solid additive (the total amount when two or more additives are used) is preferably from 0.5% to 30% by mass of the mixture. Addition of a drying oil and a semidrying oil extends the period of time required to dry the coating to a semisolid state, so it is preferable to limit the amount of such an oil when it is added.

In a threaded joint according to the second embodiment which has a lubricating coating formed of a mixture of a lubricating oil and a wax, it is preferred that the mixture have been heated to at least the temperature at which the wax is liquefied. Thus, the lubricating oil and the wax are mixed together in liquid form to form a substantially homogeneous mixture in which the wax and the lubricating oil are dissolved in each other. The liquid mixture forms, upon cooling, a solid or semisolid coating having a decreased greasiness or improved dry touch even if the proportion of the lubricating oil is relatively high.

The temperature at which the wax is liquefied is the temperature at which the wax is liquefied to cause the entire mixture of the wax and the lubricating oil to liquefy. The temperature may be below the melting point of the wax, since the wax may be liquefied at a temperature below its melting point due to the coexistence of the lubricating oil.

Heating of the mixture can be performed at any time after the formation of the mixture, namely, before, during, or after the formation of the lubricating coating.

For example, the mixture can be heated to at least the temperature at which the wax is liquefied before it is applied to the contact surface of a threaded joint. In this case, since the mixture can be heated with stirring, dissolution of the wax and the lubricating oil in each other can be achieved efficiently. The heated mixture may be applied to the contact surface either while it is hot and remains in liquid form or after cooling to a temperature at which the wax solidifies. When the heated mixture is applied at a temperature which is higher than the temperature at which the wax solidifies, it is possible to apply the mixture without dilution with a solvent. When the temperature of the mixture which is applied is lower than the temperature at which the wax solidifies, it is easier to apply the mixture after it is diluted with a solvent. In either case, the contact surface of the threaded joint to which the mixture is applied may be heated.

Heating of the mixture to at least the temperature at which the wax is liquefied may be performed during the formation of the lubricating coating by heating the contact surface of the threaded joint to be coated, or after the formation of the lubricating coating by heating the applied lubricating coating. When a solvent is used to dilute the mixture to be applied, the applied coating is sometimes heated in order to evaporate the solvent. In such a case, the heating temperature may be above the temperature at which the wax is liquefied, thereby simultaneously achieving evaporation of the solvent and dissolution of the wax and the lubricant oil in each other. Of course, heating of the mixture to at least the temperature at which the wax is liquefied may be performed two or more times before, during, and after the formation of the lubricating coating.

When the mixture to be applied is diluted with a solvent, useful solvents may be the same as described above with respect to the first embodiment. It is preferable to use a solvent which can dissolve the wax and is compatible with the lubricating oil. Even in the case where the mixture is heated and applied before the wax solidifies, the mixture may be diluted with a solvent in order to improve the applicability thereof.

The application may be performed by any appropriate method such as brush coating, spraying, and dip coating. As described with respect to the first embodiment, the contact surface of the pin and/or box of a threaded joint to be coated may be subjected to preliminary surface treatment before the mixture is applied thereto. When the mixture contains a solvent, the coating is dried to remove the solvent, if necessary, with heating. Upon cooling of the coating to room temperature and/or removal of the solvent, a solid or semisolid coating of a mixture in which the lubricating oil and the wax have been dissolved in each other is formed. This coating has a decreased greasiness, so adhesion of foreign matter thereto is minimized.

In both the first and the second embodiments, when the lubricating coating is formed on one of the contact surfaces of the pin and the box, the other contact surface on which the lubricating coating is not formed is preferably subjected to preliminary surface treatment selected from plating (e.g., zinc or copper plating), phosphate chemical conversion treatment (e.g., treatment with manganese phosphate), and oxalate chemical conversion treatment (e.g., treatment with iron oxalate) in order to improve anti-galling properties. Such preliminary surface treatment may also be applied to the contact surface on which the lubricating coating is formed.

When preliminary surface treatment by chemical conversion treatment, in particular with a phosphate or oxalate salt is applied to at least one of the pin and the box, it is preferred that a metal salt of a fatty acid be included as a solid additive in the lubricating coating. This makes it possible to provide the threaded joint for steel pipes with further improved anti-galling properties so as to ensure that the occurrence of galling can be avoided even if the steel pipes are of larger size such as casing.

In the first embodiment, the metal salt of a fatty acid is preferably included in the lower liquid layer. In the second embodiment, it is of course included in the mixture which comprises a lubricating and a wax. When the lubricating coating containing a metal salt of a fatty acid is formed on the contact surface of only one of the pin and the box, the preliminary surface treatment by chemical conversion treatment may be applied to the contact surface of either of the box or pin, or to the contact surface of both.

The metal salt of a fatty acid may be selected from the above-described various ones, but sodium stearate and calcium stearate are particularly preferred. The amount of the fatty acid metal salt is preferably in the range of 5-30% by mass of the liquid layer in the first embodiment or of the mixture in the second embodiment.

In both the first and the second embodiment of the present invention, the lubricating coating formed on the contact surface of the pin and/or box of a threaded joint for steel pipes has a decreased greasiness or surface tackiness, so it is difficult for foreign matter to adhere thereto, and thus it is possible to prevent a decrease in anti-galling properties caused by adhesion of foreign matter. Furthermore, unlike simple application of a lubricant oil, a large amount of a liquid lubricant or lubricating oil can be retained on the contact surface since it is confined by the overlying solid layer in the first embodiment or by making the coating solid or semisolid in the second embodiment. However, during fastening or loosening, the lubricating coating can act as a liquid coating due to breakdown of the upper solid layer in the first embodiment, or melting of the wax caused by the generated frictional heat to liquefy the coating in the second embodiment, so the good lubricity and self-repairing function which are characteristic of a liquid lubricant can be attained. As a result, good anti-galling properties can be obtained, which makes it possible to perform repeated fastening and loosening without application of a compound grease for each fastening even if some foreign matter such as rust or blasted grains are present inside the steel pipe to be connected.

The threaded joint for steel pipes according to the present invention also has good rust-preventing properties, so it is protected from rusting while stored for a long period. However, if desired, a protecting member capable of sealing the contact surface may be attached to the pin and/or box.

In accordance with the present invention, it becomes possible to prevent the occurrence of galling during repeated fastening and loosening, even in the case of a threaded joint for steel pipes which is relatively susceptible to galling such as a joint is of a high alloy steel, a joint for steel pipes of a large diameter (e.g., casing joint), or a joint having an increased interference in the threaded portion in order to increase the sealing properties. In addition, since the threaded joint is free from adhesion of foreign matter to the lubricating coating, which adhesion takes place easily with a liquid lubricant, a decrease in anti-galling properties due to adhesion of foreign matter can be avoided, and the threaded joint can be handled easily.

EXAMPLES

In the following examples, a repeated fastening and loosening test was performed using a threaded joint for steel pipes which comprised a pin formed at each end of the outer surface of an oil well pipe [outer diameter:7 inches (17.8 mm)] made of a 13Cr steel or carbon steel and a box mating with the pin and formed on the inner surface of a coupling member of the same steel as the pin. Each of the pin and the box had a threaded portion and an unthreaded metal contact portion so that the threaded joint was of the type capable of forming a metal-to-metal seal. A 13Cr steel is one of the high alloy steels which are known to be susceptible to galling.

In the following description, the surface of the threaded portion and the unthreaded metal contact portion of a pin are merely called the pin surface, and the surface of the threaded portion and the unthreaded metal contact portion of a box are merely called the box surface. In all the examples, a lubricating coating was formed only on the box surface (i.e., on the threaded portion and the unthreaded metal contact portion of a box).

Example 1

This example illustrates a threaded joint made of a 13Cr steel having a lubricating coating comprising a lower liquid layer and an upper solid layer formed on the box surface of the joint in accordance with the first embodiment of the present invention.

The pin surface of the joint remained untreated.

The box surface was preliminarily treated by shot blasting, and within one hour therefrom, it was coated with a lubricating coating having a liquid layer and a solid layer in the manner summarized in Table 1.

In Table 1, the viscosity of the material for a liquid layer is the value measured at 40° C. In the case of a liquid layer made of a basic metal salt of an organic acid (Ba or Ca sulfonate), it was used for application after dilution with a volatile solvent (xylene). In the case of a solid layer made of a mica powder, the powder was dispersed in a nitrocellulose solution, which was applied by spraying. The applied layer did not intermingle with the lower liquid layer, and after evaporation of the water derived from the nitrocellulose solution, a solid layer comprising a mica powder which was loosely bonded with nitrocellulose was formed.

The threaded joint treated as described above was subjected to a repeated fastening and loosening test simulating operations in the field. The rotational speed of the joint during fastening and loosening was 20 rpm, and the fastening torque was 15,000 ft-lbs (about 20,000 J). The fastening and loosening was repeated until galling occurred. When slight or mild seizing which can be repaired by dressing was found, the test (fastening) was continued after repairing. The results are shown in Table 2. The anti-galling properties of a threaded joint are good if the number of repeated times of fastening and loosening before galling is ten or more in this test.

Separately, in order to evaluate greasiness, one major surface of a block-shaped test piece of the 13Cr steel (20 mm square, 10 mm in thickness) was subjected to the same preliminary treatment as applied to the box in the above-described test, and a lubricating coating having a liquid layer and a solid layer was then formed thereon under the same conditions as described in Table 2. The test piece was weighed by a precision balance after the formation of each of the liquid and solid layers to determine the coating weight of each layer. The approximate thickness of each layer was calculated from the coating weight and the approximate density of the layer. These values are shown in Table 1.

Figure 2:
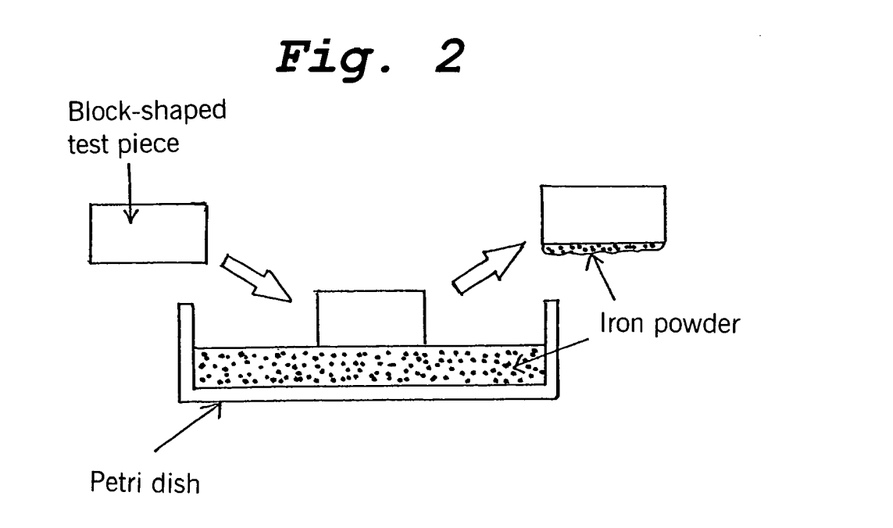
FIG. 2 is a schematic diagram showing a testing method employed in the examples to evaluate the greasiness of a lubricating coating.

The test piece was then placed with its lubricating coating facing down on a Petri dish having iron powder laid thickly therein. One minute later, the test piece was withdrawn from the dish and weighed by a precision balance to determine the weight of iron powder adhering to the lubricating coating as a measure of the greasiness of the coating. The results of this test for greasiness are also shown in Table 2. The greasiness of a lubricating coating is acceptable if the weight of adhering iron powder is 5 g/m² or less, since it was found by experience that adhesion of scales up to 5 g/m², if occurring locally, did not readily induce galling.

TABLE 1

| Run No. | Treatment for lubrication of box surface (The values in g/m² in parentheses indicate coating weight, and the values in cSt indicate viscosity of the liquid lubricant) | Thickness (μm) Liquid layer | Thickness (μm) Solid layer |
|---|---|---|---|
| 1 | Brush coating with a mineral oil of 100 cSt (about 0.5 g/m²) followed by coating with a mica powder (about 3 g/m²) | about 0.6 | about 1 |
| 2 | Brush coating with a mineral oil of 100 cSt (about 10 g/m²) followed by coating with a mica powder (about 10 g/m²) | about 11 | about 3 |
| 3 | Brush coating with Ba sulfonate having an overall basicity of 200 mg KOH/g and a viscosity of 200 cSt (about 10 g/m²) followed by coating with a mica powder (about 10 g/m²) | about 11 | about 3 |
| 4 | Brush coating with a synthetic ester oil (butyl stearate) of 50 cSt (about 2 g/m²) followed by brush coating with an oxide wax** (m.p. 65° C.) heated to 90° C. to melt it (about 100 g/m²) | about 3 | about 50 |
| 5 | Brush coating with Ca sulfonate having an overall basicity of 400 mg KOH/g and a viscosity of 300 cSt (about 10 g/m²) followed by brush coating with an oxide wax** (m.p. 65° C.) heated to 90° C. to melt it (about 10 g/m²) | about 11 | about 5 |
| 6* | Brush coating with an oxide wax** (m.p. 65° C.) heated to 90° C. to melt it (about 10 g/m²) | None | about 5 |
| 7* | Brush coating with Ba sulfonate having an overall basicity of 200 mg KOH/g and a viscosity of 200 cSt (about 10 g/m²) | about 11 | None |

*Comparative Example
**The viscosity of the oxide wax at 90° C. was about 10 cSt.

TABLE 2

| | Repeated fastening and loosening test | | Result of greasiness test | |
|---|---|---|---|---|
| Run No. | Number of times fastening performed before galling | Rating | Weight of iron powder adhered (g/m²) | Rating |
| 1 | 10 | ○ | 4.1 | ○ |
| 2 | 11 | ○ | 4.1 | ○ |
| 3 | 14 | ○ | 3.9 | ○ |
| 4 | 12 | ○ | 2.2 | ○ |
| 5 | 16 | ○ | 2.4 | ○ |
| 6* | 5 | X | 2.0 | ○ |
| 7* | 14 | ○ | 10.3 | X |

*Comparative example

As can be seen from Table 2, the lubricating coating which was comprised solely of a solid layer as a comparative example (Run No. 6) had a low greasiness, but provided the threaded joint with poor anti-galling properties as demonstrated by the number of repeated times of fasting and loosening being five. On the other hand, the lubricating coating which was comprised solely of a liquid layer as another comparative example (Run No. 7) exhibited sufficient anti-galling properties, but its greasiness was unacceptable.

In contrast, all the threaded joints having a lubricating coating according to the present invention (Runs Nos. 1-5) fully satisfied the required levels for both anti-galling properties and greasiness. In particular, in Runs Nos. 3 and 5 in which the liquid layer is formed of a basic metal salt of an organic acid showed further improved anti-galling properties. The anti-galling properties obtained in Runs Nos. 3 and 7 in which the liquid layer is formed of the same material were of the same level, indicating that the formation of a solid layer on the liquid layer in Run No. 3 did not interfere with the good lubricity attributable to the liquid layer.

Example 2

This example illustrates a threaded joint made of a 13Cr steel or a carbon steel having a lubricating coating of a mixture comprising a lubricating oil and a wax formed on the box surface of the joint in accordance with the second embodiment of the present invention.

The pin surface of the joint, to which a lubricating coating was not applied, was subjected to preliminary surface treatment, which was chemical conversion treatment with manganese phosphate for a pin made of a carbon steel, or copper plating for a pin made of a 13Cr steel.

The box surface was preliminarily treated in the same manner as in Example 1 (by shot blasting), and within one hour therefrom, it was coated with a lubricating coating of a mixture comprising a lubricating oil, wax, and optionally a solid additive in the manner summarized in Table 3. The application of the mixture was performed either after the mixture had been heated to liquefy the mixture (liquefy the wax) or after it had been diluted with a solvent to make the mixture liquid. The viscosity shown in Table 3 was the value measured at 40° C. The proportion of the constituents of the mixture shown in Table 3 was mass ratio. Table 4 shows the constitution of each mixture used to coat the box surface, the heating temperature, and the coating method.

The threaded joint having the pin and box surfaces treated as described above was tested for anti-galling properties in the same manner as described in Example 1. The greasiness of the lubricating coating was also evaluated in the same manner as described in Example 1. The results are shown in Table 5. This table also shows the approximate thickness of the lubricating coating which was determined from the coating weight of the lubricating coating formed on a block-shaped test piece for evaluation of greasiness and from its approximate density.

TABLE 3

| Run No. | Treatment for lubrication of box surface (The values in cSt indicate the viscosity of the liquid lubricant, and the values in μm indicate the average particle diameter of the powder) |
|---|---|
| 1 | Brush coating with a 3:1 mixture of a paraffin-type mineral oil of 100 cSt and petrolatum (m.p. 45° C.) after heating the mixture to 45° C. to liquefy it |
| 2 | Spraying with a liquid 2:2:1 mixture of synthetic naphthene (solvent), a synthetic monoester of 60 cSt, and paraffin wax (m.p. 70° C.) followed by drying at room temperature to evaporate the solvent |
| 3 | Brush coating with a 10:1:0.1 mixture of Ca sulfonate of 200 cSt (basicity: 200 mg KOH/g), paraffin wax (m.p. 70° C.), and a polystyrene resin powder of 1 μm after heating the mixture to 130° C. to liquefy it |
| 4 | Spraying with a liquid 2:4:1:0.1 mixture of mineral spirit (solvent), Ca phenate of 150 cSt (basicity: 180 mg KOH/g), an oxide wax (m.p. 80° C.), and an epoxy resin powder of 3 μm followed by drying at room temperature to evaporate the solvent |
| 5 | Brush coating with a 4:1 mixture of Ca salicylate of 100 cSt (basicity: 150 mg KOH/g) and an oxide wax (m.p. 65° C.) after heating the mixture to 130° C. to liquefy it |
| 6 | Spraying with a liquid 2:3:1 mixture of kerosine (solvent), Ca sulfonate of 60 cSt (basicity: 150 mg KOH/g), and paraffin wax (m.p. 69° C.) followed by drying at room temperature to evaporate the solvent |
| 7 | Brush coating with a 1:4 mixture of a paraffin-type mineral oil of 100 cSt and petrolatum (m.p. 45° C.) after heating the mixture to 45° C. to liquefy it |
| 8 | Brush coating with a 10:1 mixture of a synthetic monoester of 60 cSt and paraffin wax (m.p. 70° C.) after heating the mixture to 80° C. to liquefy it |
| 9 | Brush coating with a 1:10 mixture of an animal oil of 150 cSt and an oxide wax (m.p. 65° C.) after heating the mixture to 70° C. to liquefy it |
| 10 | Spraying with a liquid 2:1:4 mixture of mineral spirit (solvent), a vegetable oil of 150 cSt, and an oxide wax (m.p. 80° C.) followed by drying at room temperature to evaporate the solvent |
| 11 | Spraying with a liquid 2:1:10 mixture of mineral spirit (solvent), a synthetic ester oil of 100 cSt, and an oxide wax (m.p. 80° C.) followed by drying at room temperature to evaporate the solvent |
| 12 | Brush coating with a 4:4:1 mixture of an animal oil of 150 cSt, paraffin wax (m.p. 70° C.), and a polystyrene resin powder of 1 μm after heating the mixture to 80° C. to liquefy it |
| 13 | Brush coating with a 1:4:1 mixture of a vegetable oil of 200 cSt, paraffin wax (m.p. 70° C.), and a polystyrene resin powder of 1 μm after heating the mixture to 80° C. to liquefy it |
| 14 | Brush coating with a 10:1:2 mixture of a paraffin-type mineral oil of 100 cSt, an oxide wax (m.p. 65° C.), and an epoxy resin powder of 3 μm after heating the mixture to 70° C. to liquefy it |

TABLE 3-continued

Run No. | Treatment for lubrication of box surface (The values in cSt indicate the viscosity of the liquid lubricant, and the values in μm indicate the average particle diameter of the powder)
---|---
15 | Brush coating with a 1:10:2 mixture of a paraffin-type mineral oil of 100 cSt, an oxide wax (m.p. 65° C.), and an epoxy resin powder of 3 μm after heating the mixture to 70° C. to liquefy it
16 | Spraying with a liquid 2:1:10:2 mixture of mineral spirit (solvent), an animal oil of 150 cSt, an oxide wax (m.p. 80° C.), and an epoxy resin powder of 3 μm followed by drying at room temperature to evaporate the solvent
17 | Brush coating with a 4:4:1 mixture of an animal oil of 150 cSt, paraffin wax (m.p. 70° C.), and Na stearate in powder form after heating the mixture to 80° C. to liquefy it
18 | Brush coating with a 1:4:1 mixture of a vegetable oil of 200 cSt, paraffin wax (m.p. 70° C.), and Ca stearate in powder form after heating the mixture to 80° C. to liquefy it
19 | Brush coating with a 10:1:2 mixture of a paraffin-type mineral oil of 100 cSt, an oxide wax (m.p. 80° C.), and Ca stearate in powder form after heating the mixture to 90° C. to liquefy it
20 | Brush coating with a 1:10:2 mixture of a paraffin-type mineral oil of 100 cSt, paraffin wax (m.p. 70° C.), and Na oleate in powder form after heating the mixture to 70° C. to liquefy it
21 | Spraying with a liquid 2:1:4:2 mixture of mineral spirit (solvent), an animal oil of 150 cSt, an oxide wax (m.p. 80° C.), and Ca stearate in powder form followed by drying at room temperature to evaporate the solvent
22 | Spraying with a liquid 2:1:10:2 mixture of kerosine (solvent), an animal oil of 150 cSt, a paraffin wax (m.p. 70° C.), and Na stearate in powder form followed by drying at room temperature to evaporate the solvent
23 | Brush coating with a 4:1:1 mixture of Ca sulfonate of 200 cSt (basicity: 200 mg KOH/g), paraffin wax (m.p. 70° C.), and Na stearate in powder form after heating the mixture to 80° C. to liquefy it
24 | Spraying with a liquid 2:1:4:2 mixture of mineral spirit (solvent), Ca sulfonate of 200 cSt (basicity: 200 mg KOH/g), an oxide wax (m.p. 80° C.), and Ca stearate in powder form followed by drying at room temperature to evaporate the solvent
25* | Brush coating with a 1:5 mixture of Ca sulfonate of 200 cSt (basicity: 200 mg KOH/g) and polypropylene (m.p. 115° C.) after heating the mixture to 130° C. to liquefy it
26* | Spraying with a liquid 2:1:0.005 mixture of xylene (solvent), Ba phenate of 150 cSt (basicity: 100 mg KOH/g), and polystyrene (m.p. 105° C.) followed by drying at room temperature to evaporate the solvent

*Comparative example

TABLE 4

| Run No. | Wax melting point | Type of solid additive | Solvent | Mass ratio of solvent: lubricating oil: wax:solid additive | Heating temp. of mixture | Coating method |
|---|---|---|---|---|---|---|
| 1 | 45° C. | None | No | 0:3:1:0 | 45° C. | Brush |
| 2 | 70° C. | None | Yes | 2:2:1:0 | Not heated | Spray |
| 3 | 70° C. | Resin powder | No | 0:10:1:0.1 | 130° C. | Brush |
| 4 | 80° C. | Resin powder | Yes | 2:4:1:0.1 | Not heated | Spray |
| 5 | 65° C. | None | No | 0:4:1:0 | 130° C. | Brush |
| 6 | 69° C. | None | Yes | 2:3:1:0 | Not heated | Spray |
| 7 | 45° C. | None | No | 0:1:4:0 | 45° C. | Brush |
| 8 | 70° C. | None | No | 0:10:1:0 | 80° C. | Brush |
| 9 | 65° C. | None | No | 0:1:10:0 | 70° C. | Brush |
| 10 | 80° C. | None | Yes | 2:1:4:0 | Not heated | Spray |
| 11 | 80° C. | None | Yes | 2:1:10:0 | Not heated | Spray |
| 12 | 70° C. | Resin powder | No | 0:4:4:1 | 80° C. | Brush |
| 13 | 70° C. | Resin powder | No | 0:1:4:1 | 80° C. | Brush |
| 14 | 65° C. | Resin powder | No | 0:10:1:2 | 70° C. | Brush |
| 15 | 65° C. | Resin powder | No | 0:1:10:2 | 70° C. | Brush |
| 16 | 80° C. | Resin powder | Yes | 2:1:10:2 | Not heated | Spray |
| 17 | 70° C. | Fatty acid salt | No | 0:4:4:1 | 80° C. | Brush |
| 18 | 70° C. | Fatty acid salt | No | 0:1:4:1 | 80° C. | Brush |
| 19 | 80° C. | Fatty acid salt | No | 0:10:1:2 | 90° C. | Brush |
| 20 | 70° C. | Fatty acid salt | No | 0:1:10:2 | 70° C. | Brush |
| 21 | 80° C. | Fatty acid salt | Yes | 2:1:4:2 | Not heated | Spray |
| 22 | 70° C. | Fatty acid salt | Yes | 2:1:10:2 | Not heated | Spray |
| 23 | 70° C. | Fatty acid salt | No | 0:4:1:1 | 80° C. | Brush |
| 24 | 80° C. | Fatty acid salt | Yes | 2:1:4:2 | Not heated | Spray |
| 25* | 115° C.** | None | No | 0:1:5**:0 | 130° C. | Brush |
| 26* | 105° C.** | None | Yes | 2:1:0.005**:0 | Not heated | Spray |

*Comparative example;
**Resin

TABLE 5

| Run No. | Coating thickness (μm) | Number of times fastening performed before galling in repeated fastening/loosening test | | | Result of greasiness test | |
|---|---|---|---|---|---|---|
| | | Carbon steel and Mn phosphate | 13Cr steel and Cu plating | Rating | Weight of iron powder adhered (g/m²) | Rating |
| 1 | 2 | 13 | 12 | ○ | 3.1 | ○ |
| 2 | 1 | 14 | 13 | ○ | 2.4 | ○ |
| 3 | 10 | 17 | 16 | ○ | 4.0 | ○ |
| 4 | 100 | 18 | 17 | ○ | 2.9 | ○ |
| 5 | 200 | 17 | 16 | ○ | 3.1 | ○ |
| 6 | 50 | 18 | 17 | ○ | 2.4 | ○ |
| 7 | 50 | 17 | 16 | ○ | 1.3 | ○ |
| 8 | 45 | 15 | 14 | ○ | 3.9 | ○ |
| 9 | 55 | 15 | 14 | ○ | 0.9 | ○ |
| 10 | 50 | 15 | 13 | ○ | 1.5 | ○ |
| 11 | 45 | 15 | 14 | ○ | 0.8 | ○ |
| 12 | 40 | 17 | 15 | ○ | 2.9 | ○ |
| 13 | 50 | 17 | 15 | ○ | 1.7 | ○ |
| 14 | 55 | 15 | 15 | ○ | 3.9 | ○ |
| 15 | 55 | 15 | 14 | ○ | 0.9 | ○ |
| 16 | 50 | 15 | 15 | ○ | 0.8 | ○ |
| 17 | 40 | 25 | 15 | ○ | 2.4 | ○ |
| 18 | 45 | 25 | 14 | ○ | 1.3 | ○ |
| 19 | 55 | 20 | 15 | ○ | 3.3 | ○ |
| 20 | 45 | 20 | 15 | ○ | 0.8 | ○ |
| 21 | 55 | 25 | 16 | ○ | 1.2 | ○ |
| 22 | 50 | 20 | 16 | ○ | 0.8 | ○ |
| 23 | 50 | 25 | 16 | ○ | 1.3 | ○ |
| 24 | 45 | 25 | 16 | ○ | 0.7 | ○ |
| 25* | 100 | 4 | 3 | X | 0.6 | ○ |
| 26* | 30 | 14 | 13 | ○ | 10.3 | X |

*Comparative example

As can be seen from Table 5, all the threaded joints having a lubricating coating of a mixture comprising a lubricating oil and a wax according to the present invention fully satisfied the required levels for both anti-galling properties and greasiness. Also in this example, in the case of a threaded joint made of a 13Cr steel which is known to be susceptible to galling, the anti-galling properties of the joint seemed to be further improved to some extent when a basic metal salt of an organic acid was used as a lubricant oil (Runs Nos. 3-6). On the other hand, in the case of a threaded joint made of a carbon steel, when the unlubricated pin surface was subjected to preliminary surface treatment by phosphating with manganese phosphate, particularly good anti-galling properties demonstrated by the number of repeated times of fastening and loosening being 20 or greater were attained with a lubricating coating containing a metal salt of a fatty acid as a solid additive (Runs Nos. 17-24), thereby making it possible to prevent the occurrence of galling even in a threaded joint for steel pipes having a large diameter which is known to be susceptible to galling.

In contrast, when a lubricating oil was mixed with a resin in place of a wax as a comparative example, either anti-galling properties were poor (Run No. 25) or greasiness was unacceptable (Run No. 26).

The invention claimed is:

1. A pin adapted for use in a threaded joint for steel pipes, the pin having a contact surface including a threaded portion and an unthreaded metal contact portion and which has a lubricating coating on the contact surface, characterized in that the lubricating coating comprises an upper lubricant layer which is in solid form at 40° C. and appears as an outer surface for the contact surface of the pin, and a lower lubricant layer which is in liquid form in the temperature range of above 0° C. and below 40° C., the lower lubricant layer disposed between the contact surface and the upper lubricant layer.

2. A pin as recited in claim 1, wherein the contact surface is subjected to preliminary surface treatment.

3. A pin as recited in claim 2, wherein the preliminary surface treatment is chemical conversion treatment with a phosphate or an oxalate, and wherein the lubricating coating contains a fatty acid metal salt as a solid additive.

4. A pin as recited in claim 3, wherein the fatty acid metal salt is one or more substances selected from alkali metal salts and alkaline earth metal salts of stearic acid or oleic acid.

5. A pin as recited in claim 1, wherein the lubricant layer in liquid form comprises one or more materials selected from mineral oils, synthetic ester oils, animal or vegetable oils, and basic metal salts of an organic acid.

6. A box adapted for use in a threaded joint for steel pipes, the box having a contact surface including a threaded portion and an unthreaded metal contact portion and which has a lubricating coating on the contact surface, characterized in that the lubricating coating comprises an upper lubricant layer which is in solid form at 40° C. and appears as an outer surface for the contact surface of the box, and a lower lubricant layer which is in liquid form in the temperature range of above 0° C. and below 40° C., the lower lubricant layer disposed between the contact surface and the upper lubricant layer.

7. A box as recited in claim 6, wherein the contact surface is subjected to preliminary surface treatment.

8. A box as recited in claim 7, wherein the preliminary surface treatment is chemical conversion treatment with a phosphate or an oxalate, and wherein the lubricating coating contains a fatty acid metal salt as a solid additive.

9. A box as recited in claim 8, wherein the fatty acid metal salt is one or more substances selected from alkali metal salts and alkaline earth metal salts of stearic acid or oleic acid.

* * * * *